(12) United States Patent
El Zahab et al.

(10) Patent No.: US 9,587,828 B2
(45) Date of Patent: Mar. 7, 2017

(54) LOCALIZED FLUE GAS DILUTION IN HEAT RECOVERY STEAM GENERATOR

(71) Applicants: Zaher El Zahab, Orlando, FL (US); Gerald J. Feller, Orlando, FL (US)

(72) Inventors: Zaher El Zahab, Orlando, FL (US); Gerald J. Feller, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1025 days.

(21) Appl. No.: 13/803,798

(22) Filed: Mar. 14, 2013

(65) Prior Publication Data

US 2014/0260286 A1    Sep. 18, 2014

(51) Int. Cl.
| | | |
|---|---|---|
| F23J 15/00 | (2006.01) | |
| F22D 1/02 | (2006.01) | |
| F28F 13/04 | (2006.01) | |
| F22D 1/12 | (2006.01) | |
| F23J 15/06 | (2006.01) | |
| F01K 23/10 | (2006.01) | |

(52) U.S. Cl.
CPC .............. *F23J 15/003* (2013.01); *F22D 1/02* (2013.01); *F22D 1/12* (2013.01); *F23J 15/06* (2013.01); *F28F 13/04* (2013.01); *F01K 23/10* (2013.01); *F01K 23/101* (2013.01); *F23J 2215/20* (2013.01); *F23J 2219/20* (2013.01); *F23J 2219/201* (2013.01); *Y02E 20/16* (2013.01); *Y02E 20/363* (2013.01)

(58) Field of Classification Search
CPC ........ F23J 15/003; F23J 15/06; F23J 2219/20; F23J 2219/201; F22D 1/12; F01K 23/10; F01K 23/101; Y02E 20/363; Y02E 20/16; F28F 13/04
See application file for complete search history.

(56) References Cited

U.S. PATENT DOCUMENTS

| | | |
|---|---|---|
| 3,910,236 A | 10/1975 | Merrit, Jr. |
| 4,173,949 A | 11/1979 | Roethe |
| 4,287,938 A * | 9/1981 | Lagerquist ............... F23J 15/06 165/104.25 |
| 4,426,037 A | 1/1984 | Bernstein |
| 4,611,652 A | 9/1986 | Bernstein et al. |
| 4,681,744 A * | 7/1987 | Weitman ................ F23J 15/006 165/133 |
| 4,682,549 A | 7/1987 | Hall |

(Continued)

FOREIGN PATENT DOCUMENTS

| | | |
|---|---|---|
| CN | 201524525 U | 7/2010 |
| CN | 201636884 U | 11/2010 |

(Continued)

*Primary Examiner* — Charles Freay
*Assistant Examiner* — Christopher Bobish

(57) ABSTRACT

A heat recovery steam generator (HRSG) (10) including: an economizer (12) configured to heat a working fluid by extracting heat from a flow of flue gas (20). The HRSG includes a diluting fluid injector arrangement (60) configured to inject a diluting fluid (50) effective to dilute a concentration of a gaseous corrosive when compared to an undiluted concentration of the gaseous corrosive in the flow of flue gas. The HRSG also includes a preheater (18) configured to preheat the diluting fluid prior to injection.

19 Claims, 3 Drawing Sheets

(56) References Cited

U.S. PATENT DOCUMENTS

| | | | |
|---|---|---|---|
| 4,776,391 A | 10/1988 | Warner | |
| 4,999,167 A * | 3/1991 | Skelley | B01D 53/343 |
| | | | 110/215 |
| 6,245,308 B1 | 6/2001 | Tokunaga et al. | |
| 6,397,788 B2 * | 6/2002 | Besik | F22B 1/18 |
| | | | 122/367.3 |
| 2006/0150630 A1 | 7/2006 | Harpster | |
| 2011/0308436 A1 * | 12/2011 | MacMurray | F23J 15/006 |
| | | | 110/215 |

FOREIGN PATENT DOCUMENTS

| | | |
|---|---|---|
| CN | 102944018 A | 2/2013 |
| GB | 1577202 A | 10/1980 |
| JP | H0623347 A | 2/1994 |

\* cited by examiner

LOCALIZED FLUE GAS DILUTION IN HEAT RECOVERY STEAM GENERATOR

FIELD OF THE INVENTION

The invention relates to maximizing thermal efficiency of a combined cycle power generation plant via greater heat exchange in a heat recovery steam generator. In particular, the invention eliminates the need to preheat a working fluid entering an economizer, thereby enabling the economizer to extract more heat from flue gas.

BACKGROUND OF THE INVENTION

In a combined cycle power generation plant a heat recovery steam generator (HRSG) may be used to recover heat exhausted by a separate process such as the operation of a gas turbine engine. The HRSG receives the exhausted gas and uses various heat exchanging components to transfer the heat from the exhausted gas to a working fluid. In certain operations the exhaust gas may contain corrosive elements that may cause damage to the heat exchanging components if the flue gas is cooled below a threshold level. For example, gas turbine operations using high sulfur fuels generate flue gas having a relatively high concentration of sulfur oxides, including sulfur dioxide and sulfur trioxide. Sulfur trioxide forms when sulfur dioxide is oxidized. Gaseous sulfuric acid is then formed when sulfur trioxide combines with water vapor. If cooled below a sulfuric acid dew point, the sulfuric acid gas will form liquid sulfuric acid on HRSG interior surfaces, including heat exchanging element external surfaces and the liquid sulfuric acid will damage the interior surfaces, in particular the heat exchanging element external surfaces. When entering the HRSG the flue gas is at a temperature above the sulfuric acid dew point, and hence the formation of liquid sulfuric acid is not a problem at this location. As the flue gas traverses the HRSG and heat is drawn from the flue gas the temperature of the flue gas cools. In addition to corrosives, water vapor may condense and form liquid water on the heat exchanging elements if the flow of flue gas is cooled below the water vapor temperature. This liquid water may interfere with the heat exchanging process and accelerate the flow process in an undesired manner.

Under conventional HRSG operations, care is taken to prevent the temperature of the flue gas from dropping below the sulfuric acid dew point and/or a water dew point at any location in the HRSG. This can be done by, for example heating the working fluid entering heat exchanging elements disposed within the flow of flue gas such that external surfaces of the heat exchanging elements remain sufficiently warm to prevent the unwanted condensation. However, under thermodynamically optimal operation of a HRSG, the working fluid entering at least one of the heat exchanging elements within the HRSG would be at a temperature below the sulfuric acid dew point and/or the water dew point of the flue gas. In this thermodynamically optimal scenario, the relatively cool working fluid would cause the external surface of the heat exchanging element to be below the dew point until heated. When the flue gas encounters the relatively cool surface, or a local volume within the flue duct that has been cooled by the relatively cool surface, the flue gas cools to below the sulfuric acid dew point. Liquid sulfuric acid then forms on the relatively cool surface of the heat exchanging element. The liquid sulfuric acid then acts as a thermal insulator which mitigates heat transfer from the flue gas to the working fluid. This results in the relatively cool working fluid staying cooler longer, which, in turn, expands the size of the relatively cool surface of the heat exchanging element upon which sulfuric acid will form. Over time this liquid sulfuric acid can damage and/or destroy the heat exchanging element.

One conventional solution to this problem has been to preheat the working fluid entering the heat exchanging element to a temperature above the sulfuric acid dew point. In this case, since the working fluid is already above the sulfuric acid dew point when entering the heat exchanging element, liquid sulfuric acid will not form on the heat exchanging elements. However, heating the working fluid necessarily reduces the amount of heat that can be transferred from the flue gas to the working fluid. This reduction in heat transfer reduces a thermal efficiency of the heat recovery steam generator. Consequently, there is room for improvement in the art.

BRIEF DESCRIPTION OF THE DRAWINGS

The invention is explained in the following description in view of the drawings that show.

DETAILED DESCRIPTION OF THE INVENTION

The present inventors are aware that a thermal efficiency of a HRSG used in a combined cycle power plant, such as one using a gas turbine engine and a HRSG, is reduced by a need to preheat working fluid entering heat exchanging elements when there is a possibility that liquid sulfuric acid or liquid water may form on the portions of the heat exchanging elements and cause damage or interfere with the heat transfer process and flow of flue gas. They are further aware that without the preheating the liquid sulfuric acid or water formation would occur on these portions of the heat exchanging elements because these portions would be cooled by the working fluid to a temperature below a sulfuric acid dew point. The inventors have devised an innovative alternative solution to the corrosion problem that takes advantage of the fact that the sulfuric acid dew point varies with a concentration of the gaseous sulfuric acid in the flue gas. This solution can also be used to prevent the formation of liquid water and alleviate the problems associated there with.

Instead of preheating the working fluid, or using sacrificial heat exchanging elements, the inventors propose to allow cooler working fluid to enter the heat exchanging unit. To reduce and/or prevent the formation of liquid sulfuric acid that would be anticipated in prior art HRSGs without preheating, the inventors locally dilute a concentration of gaseous sulfuric acid in a local volume within the flow of flue gas where liquid sulfuric acid might otherwise form. Since liquid sulfuric acid would be anticipated to form on the portion of the heat exchanging elements cooled by the working fluid to a temperature below the sulfuric acid dew point in the undiluted flue gas, the inventors propose to dilute the concentration of gaseous sulfuric acid in a local volume that separates the flue gas having undiluted gaseous sulfuric acid from the relatively cool portion of the heat exchanging exterior surface. Thus, the portion of the heat exchanging element may define a portion of that diluted local volume. Alternatively, the portion may be partially or entirely within the diluted local volume. Stated another way, the inventors propose to reduce/prevent the formation of liquid sulfuric acid by lowering the local sulfuric acid dew point within the local volume, where the local volume protects a surface where liquid sulfuric acid would otherwise be likely to form, by separating the protected surface from the flue gas having undiluted gaseous sulfuric acid.

Figure 1:
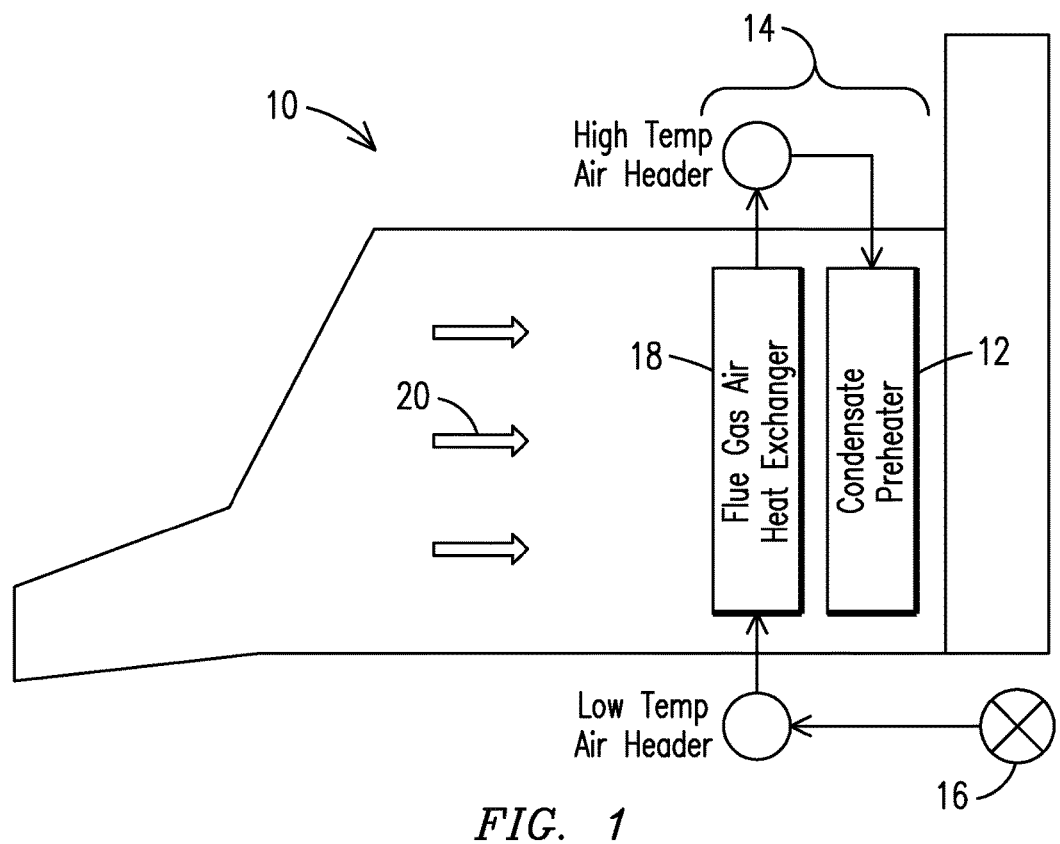
FIG. 1 is a schematic representation of a heat recovery steam generator (HRSG) having an exemplary embodiment of the concentration dilution arrangement disclosed herein.

FIG. 1 is a schematic representation of an HRSG including a heat exchanging arrangement 12 and a dilution arrangement 14 shown generally. Not illustrated for purposes of clarity is the known evaporator portion of the HRSG. In the exemplary embodiment shown the heat exchanging arrangement 12 is shown to be a condensate preheater located generally at a colder end of the HRSG. However, the invention can be applied to any heat exchanging element where an undesirable liquid may form without dilution. For example, the heat exchanging element may be any economizer that extracts heat from flue gas and delivers the heat to a working fluid (i.e. a second fluid) that subsequently travels through an evaporator. Further, while the exemplary embodiment described herein addresses the formation of liquid sulfuric acid, the concepts and structure may be used to prevent the formation of any other liquid such as a liquid corrosive when a gaseous form of the corrosive is present in the flue gas. Major components of the dilution arrangement 14 that are visible include a dilution fluid source 16 and optionally a preheater 18. The dilution fluid source 16 may be a fan or other means that cause the dilution fluid to flow. The preheater 18 may be any arrangement that preheats the dilution fluid to a desired temperature. In the exemplary embodiment shown the preheater 18 is shown as a flue gas air heat exchanger that transfers heat (i.e. permits thermal communication) from a flow of flue gas 20 (i.e. a first fluid) to the dilution fluid. In alternate exemplary embodiments the preheater may be, for example, an arrangement that receives heat from another working fluid in the HRSG 10, or electrical, or gas powered etc. In such exemplary embodiments the preheater may be disposed external to the flow of flue gas 20. In operation the working fluid flows through the preheater 18 where it is heated to the desired temperature. The working fluid then flows into an additional injection arrangement (not shown) adjacent a heat exchanging element (not shown) where it is injected into the flow of flue gas 20 to create a local volume (or volumes) of flue gas having a reduced concentration of gaseous sulfuric acid. Each volume may include a film over the surface to be protected. The dilution fluid source 16 may pressurize the dilution fluid as necessary, or this may be done separately, such as with a forced draft fan or the like. Alternately, when only local dilution is wanted, the preheater 18 may be dispensed with.

Figure 2:
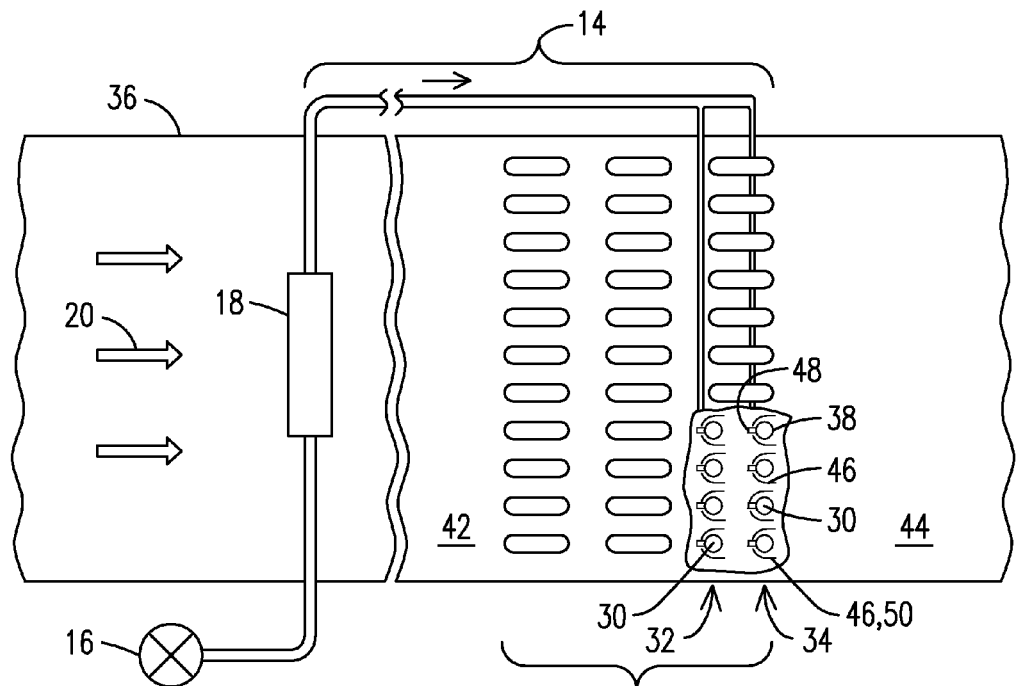
FIG. 2 is a top view of an HRSG heat exchanging arrangement and an exemplary embodiment of the concentration dilution arrangement disclosed herein.

FIG. 2 shows a top view and partial cutaway of the heat exchanging arrangement 12 and dilution arrangement 14 of FIG. 1. Within the heat exchanging arrangement 12, or condensate preheater, there may be plural rows of heat exchanging elements 30, including an upstream row 32 and a downstream row 34 with respect to the flue gas 20 flowing through a duct 36 in which the heat exchanging elements 30 are disposed. As the flow of flue gas 20 travels through the heat exchanging arrangement 12 it encounters an exterior/shell side 38 of these rows of heat exchanging elements 30. Heat transfers from the flow of flue gas 20 to the working fluid on a second side 40 of (i.e. within) the heat exchanging elements 30. Thus, as the flow of flue gas 20 travels from an upstream end 42 to a downstream end 44 of the heat exchanging arrangement 12 the flow of flue gas 20 cools. Working fluid enters the heat exchanging elements 30 starting from the downstream end 44 and working its way toward the upstream end 42, during which time the heat from the flow of flue gas 20 heats the working fluid.

From the foregoing flow description it can be seen that at the downstream end 44 the flow of flue gas 20 will be at its coolest temperature and the working fluid will also be at its coolest temperature. In this exemplary embodiment it is at the downstream end that the flow of flue gas 20 may encounter a heat exchanging element 30 having an exterior side 38 with a portion of the exterior side 38 that may be at a temperature below the dew point of the undiluted gaseous sulfuric acid in the flow of flue gas 20. Thus, it is at the downstream end 44 that a volume 46 within the flow of flue gas 20 would be created having a diluted concentration of gaseous sulfuric acid. This volume 46 will be used to at least protect the portion of the exterior side 38 that may be at a temperature below the dew point of the undiluted gaseous sulfuric acid.

The volume 46 may be formed by injecting the dilution fluid 50, for example air, or other non corrosive fluids, proximate the portion of the exterior side 38 to be protected via the injection arrangement that may include injectors 48. This can also be seen in FIG. 3, where the portion 52 of the downstream row 34 spans an entire length of the heat exchanging element 30 within the duct 36. However, the portion 54 of the upstream row 32 spans less than the entire length of the heat exchanging element 30 within the duct 36. This may occur in an exemplary embodiment when the working fluid heats while traveling through the downstream row 34 and continues to heat while traveling through the upstream row 32. By the time the working fluid reaches an end 56 of the portion 54 of the upstream row 32 the working fluid has been heated sufficiently such that it is at a temperature above the sulfuric dew point of undiluted gaseous sulfuric acid in the flow of flue gas 20. At or above this temperature dilution is no longer needed because the undiluted gaseous sulfuric acid will not condense on the exterior side 38 of the heat exchanging element 30. Thus, as described above, the portions 52, 54 of the heat exchanging elements 30 that were likely to be at a temperature that would cause undiluted gaseous sulfuric acid to condensate on them were protected by the volume 46 having a diluted concentration of gaseous sulfuric acid. These portions 52, 54 then acted to define a part of the volume 46. In an exemplary embodiment the dilution arrangement 14 may protect only those portions 52, 54 needing protection. These portions 52, 54 may account, for example, for about 20% of all heat exchanging surfaces exposed to the flow of flue gas 20 in the heat exchanging arrangement 12. However, it is conceivable that other factors may influence design considerations and hence more or less of the exterior side 38 may be protected than would be likely to condense sulfuric acid.

The preheater 18, which is shown as external to the flow of flue gas 20 in this exemplary embodiment, may be configured to warm the dilution fluid to a temperature close to or the same as that of a temperature of the flow of flue gas 20 at the point of injection. For the injectors 48 on the upstream row 32, this temperature could be a temperature of the flow of flue gas 20 immediately upstream of the upstream row 32. Likewise, for the injectors 48 on the downstream row 34, this temperature may be a temperature of the flow of flue gas 20 immediately upstream of the downstream row 34. This may be desired to prevent an adverse thermal layer from forming between the flow of flue gas 20 and the exterior side 38 of the heat exchanging element 30 that might inhibit heat exchange from the flow of flue gas 20 to the working fluid. Some of this added heat may be recaptured via transfer to the working fluid during the heat exchanging process.

Figure 4:
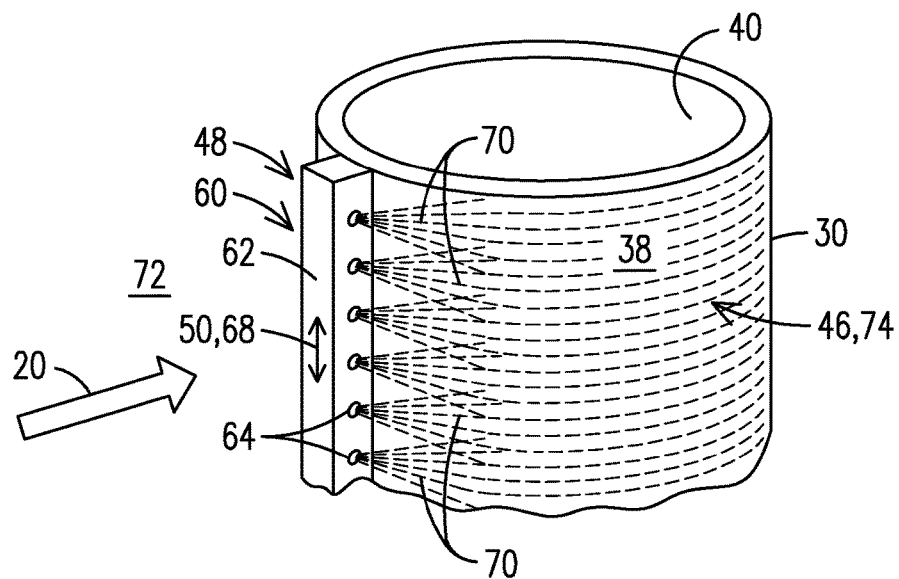
FIG. 4 is a view of a heat exchanging element of the HRSG heat exchanging arrangement of FIG. 2 and an exemplary embodiment of an injection arrangement of the concentration dilution arrangement of FIG. 2.
Figure 3:
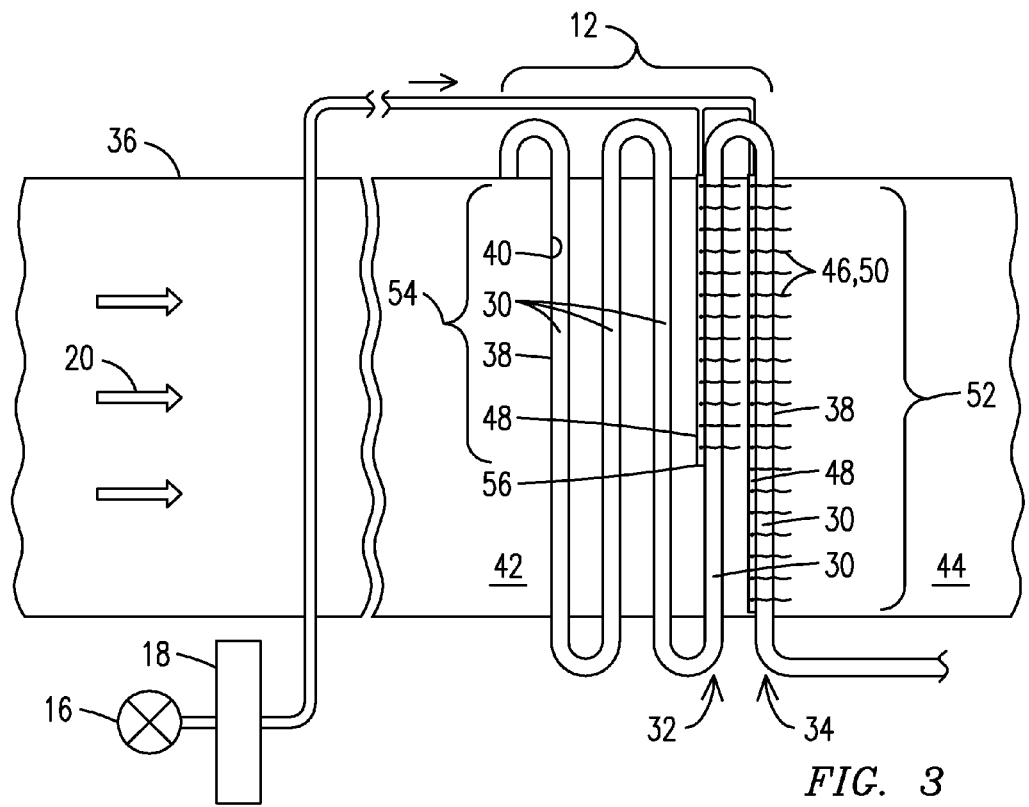
FIG. 3 is a side view of the HRSG heat exchanging arrangement and the exemplary embodiment of the concentration dilution arrangement of FIG. 2.

FIG. 4 discloses a close up view of one of the heat exchanging elements 30 of FIGS. 2 and 3 and an exemplary embodiment of the injection arrangement 60. The injection arrangement may include injectors 48 having one or more injection manifolds 62, for example a conduit channel etc., each having one or a plurality of outlets 64 (i.e. orifices). Dilution fluid 50 may travel longitudinally 68 through the injection manifold 62 and exit the outlets 64. The outlets 64 may be formed so that streams 70 of dilution fluid 50 quickly merge to make the volume 46 uniform. In the exemplary embodiment shown the injection manifold 62 may be disposed on an upstream side 72 of the heat exchanging element 30 with respect to a direction of travel of the flow of flue gas 20. The outlets 64 inject the dilution fluid 50 essentially tangential to the exterior side 38. In this configuration the volume 46 includes a film 74 that blankets the exterior side 38. Such an injection configuration does not interfere with heat transfer rates. Within this volume 46 the dilution fluid, which may be air, dilutes the concentration of gaseous sulfuric acid. This lowers the sulfuric acid dew point within the volume. With a lower dew point in the volume 46 adjacent the exterior side 38, an inlet temperature of the working fluid can be reduced to a temperature at or slightly above the dew point of the diluted concentration of gaseous sulfuric acid in the volume 46. Lowering the inlet temperature of the working fluid allows for more heat transfer from the flow of flue gas 20. Hence, the HRSG operates more efficiently.

Figure 5:
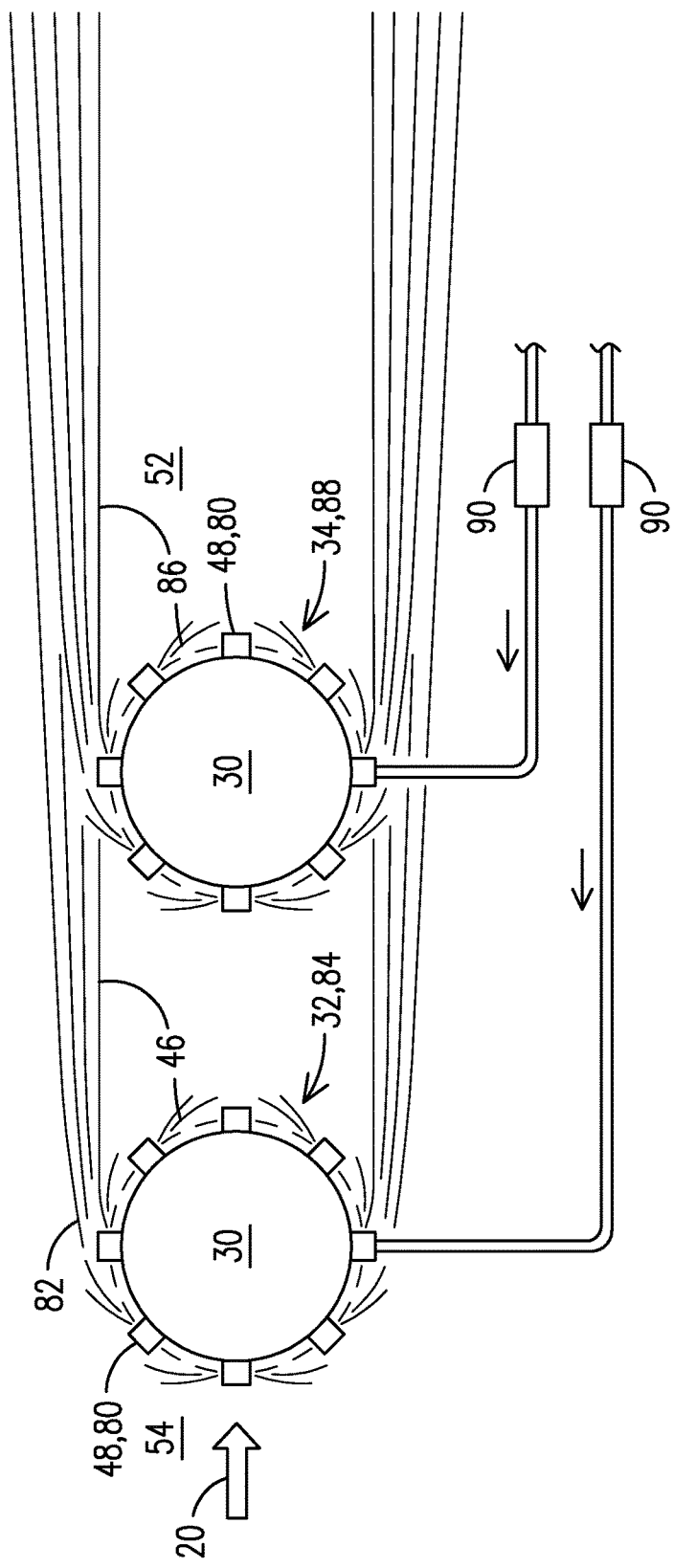
FIG. 5 shows plural heat exchanging elements arranged in accord with an exemplary embodiment of the concentration dilution arrangement of FIG. 2.

The upstream row 32 and downstream row 34 can be seen in greater detail in FIG. 5. In this exemplary embodiment dilution fluid is injected at a plurality of outlets 80 around each heat exchanging element 30. The outlets 80 form an upstream volume 82 that, in this exemplary embodiment, includes a first film 84 between the flow of flue gas 20 having the undiluted concentration of the corrosive, such as gaseous sulfuric acid, and the portion 54 of the upstream row 32 (i.e. the first heat exchanging element) that needs to be protected because it may be at the relatively cool temperature. The downstream row 34 (i.e. the second heat exchanging element) may have its own dilution fluid injected through its plurality of outlets 80 to form the a downstream volume 86 that, in this exemplary embodiment, includes a second film 88 between the flow of flue gas 20 having the undiluted concentration of the corrosive, such as gaseous sulfuric acid, and the portion 52 of the downstream row 34 that needs to be protected.

In an exemplary embodiment the upstream row 32 and the downstream row 34 can be aligned within the flow of flue gas 20 such that diluting fluid injected into the upstream volume 82 (i.e. first volume) travels with the flow of flue gas 20 to contribute to the downstream volume 86 (i.e. second volume). The injectors 48 and its outlets 80 associated with the upstream row 32 (i.e. first injectors and first outlets) may inject the same amount of diluting fluid, more diluting fluid, or less diluting fluid than the injectors and outlets 80 associated with the downstream row 34 (i.e. second injectors and second outlets). Many factors may be considered when designing the desired arrangement. For example, as the flow of flue gas 20 travels from the upstream row 32 to the downstream row 34 the flow of flue gas 20 cools, as does the temperature of the working fluid. Thus, a greater amount of dilution may be needed in the downstream volume 86. This can be accomplished by, for example, flowing more diluting fluid through the downstream row 34 to create a larger downstream volume 86 (and a thicker second film 88). Alternately, or in addition, the thicker second film 88 may result by having an arrangement where the dilution fluid used to form the upstream volume 82 is allowed to contribute to the downstream volume 86 as shown. This may permit the option of reducing the flow of dilution air injected at the downstream row 34. Having injectors 48 that are the same from one heat exchanging element 30 to the next may simplify manufacturing. On the other hand, having injectors that vary may permit a degree of fine tuning that may be desired. In addition, there may be an injection air control system 90 to permit active control of the amount of diluting air being injected.

Models incorporating the concepts disclosed herein have predicted as much as a 25% reduction in the concentration of gaseous sulfuric acids. This would enable the inlet temperature of the working fluid to the condensate preheater to be reduced by as much as 20 degrees Celsius. While exactly how much depends on many factors, this reduced inlet temperature may yields substantial savings that significantly outweighs the cost to implement and maintain the dilution arrangement. Consequently, the HRSG disclosed herein represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An HRSG, comprising:
an economizer configured to heat a working fluid by extracting heat from a flow of flue gas, the economizer comprising a heat exchanger tube comprising a surface portion and a diluting fluid injector arrangement configured to inject a diluting fluid effective to create a diluted volume within the flow of flue gas, the diluted volume at least partly separates an undiluted volume flow of flue gas from the heat exchanger tube, the sulfuric dew point of the diluted volume is lower in comparison to the undiluted volume, wherein a portion of the economizer extracts heat from undiluted flue gas, and a portion extracts heat from the diluted volume; and
a preheater configured to preheat the diluting fluid prior to injection.

2. The HRSG of claim 1, wherein the surface portion characterized by a temperature below a dew point of the undiluted gaseous corrosive in the flue gas, the surface portion at least partly separated from the flow of flue gas comprising the undiluted gaseous corrosive by the diluted volume, wherein the gaseous corrosive of the diluted volume is characterized by a dew point below the temperature of the surface portion.

3. The HRSG of claim 1, wherein the preheater comprises a flue gas air heat exchanger disposed in the flow of flue gas and effective to transfer heat from the flow of flue gas to the diluting fluid.

4. The HRSG of claim 1, wherein the economizer comprises:
- at least a portion of an upstream heat exchanging tube separated from the flow of flue gas comprising the undiluted gaseous corrosive by a diluted upstream volume comprising the diluted gaseous corrosive, and
- at least a portion of a downstream heat exchanging tube separated from the flow of flue gas comprising the undiluted gaseous corrosive by a diluted downstream volume comprising the diluted gaseous corrosive,
- wherein the upstream heat exchanging tube is aligned within the flow of flue gas with the downstream heat exchanging tube.

5. The HRSG of claim 1,
wherein the diluting fluid is pressurized air.

6. An HRSG, comprising:
- a flue duct;
- a heat exchanger disposed in the flue duct and comprising a heat exchanging element configured to provide thermal communication between a first fluid flowing in the flue duct and a second fluid flowing in the heat exchanging element; and
- an injector arrangement configured to inject a diluting fluid into the flue duct adjacent a shell side of the heat exchanging element, the injector arrangement effective to dilute some, but not all, of the first fluid, the diluted first fluid flow separates the heating exchange element from the undiluted first fluid flow such that forming liquid sulfuric acid on the heating exchange element is avoided, the diluted first fluid flow has a sulfuric dew point different than the undiluted first fluid flow.

7. The HRSG of claim 6, further comprising a diluting fluid preheater configured to heat the diluting fluid prior to injecting the diluting fluid into the flue duct.

8. The HRSG of claim 7, wherein the diluting fluid preheater comprises a flue gas air heat exchanger effective to transfer heat from the first fluid to the diluting fluid.

9. The HRSG of claim 6, wherein the-first heat exchanging element comprises a tube, and wherein the injector arrangement comprises a conduit comprising an outlet, wherein the conduit is disposed on the shell side of the tube and the outlet is configured to inject the diluting fluid across the shell side of the tube.

10. The HRSG of claim 6,
wherein the sulfuric dew point of the diluted first flow is lower than the sulfuric dew point of the undiluted first flow.

11. The HRSG of claim 6, wherein the diluting fluid is pressurized air.

12. A method of operating a HRSG, comprising:
- receiving a flue gas comprising an undiluted gaseous corrosive in a duct;
- flowing a working fluid through a heat exchanger in the duct, the heat exchanger effective to permit heat transfer between the flue gas and the working fluid;
- transferring heat from the flue gas comprising the undiluted gaseous corrosive and disposed within the heat exchanger;
- diluting the undiluted gaseous corrosive using a diluting fluid injector arrangement disposed within the heat exchanger to form a first volume within the flue gas comprising a diluted gaseous corrosive, wherein the first volume at least partially separates a first portion of a surface of the heat exchanger from the flue gas comprising the undiluted gaseous corrosive, the first portion characterized by a temperature below a dew point of the undiluted gaseous corrosive and above a dew point of the diluted gaseous corrosive; and
- transferring heat from the volume comprising the diluted gaseous corrosive within the heat exchanger.

13. The method of claim 12, further comprising injecting diluting air to form the first volume.

14. The method of claim 13, wherein the diluting air mixes with the undiluted gaseous corrosive to form the first volume, the first volume comprising a first protective film disposed over the first portion of the surface of the heat exchanger.

15. The method of claim 13, further comprising injecting the diluting air in a direction tangential to the first portion of the surface of the heat exchanger in a direction of flow of the flue gas.

16. The method of claim 14, wherein the heat exchanger comprises a first tube comprising the first portion, and wherein the method further comprises injecting the diluting air from a diluting air channel disposed on an upstream side of the first tube with respect to a direction of travel of the flue gas.

17. The method of claim 13, further comprising:
- diluting the undiluted gaseous corrosive to form a downstream volume within the flue gas comprising the diluted gaseous corrosive, wherein the downstream volume at least partially separates a downstream portion of the surface of the heat exchanger from the flue gas comprising the undiluted gaseous corrosive, the downstream portion characterized by a temperature below the corrosive acid dew point of the undiluted gaseous corrosive and above a dew point of the diluted gaseous corrosive in the downstream volume.

18. The method of claim 17, further comprising:
- injecting the diluting air to form the first volume comprising a first protective film of the diluted gaseous corrosive over the first portion of the surface of the heat exchanger;
- injecting diluting air to form the downstream volume comprising a downstream protective film of diluted gaseous corrosive over the downstream portion of the surface of the heat exchanger;
- wherein the downstream portion of the surface is positioned downstream of the first portion of the surface of the heat exchanger with respect to a direction of travel of the flue gas, and
- wherein the first volume contributes to the downstream protective film.

19. The method of claim 12, wherein the corrosive is sulfuric acid.

* * * * *